United States Patent [19]

Redman et al.

[11] Patent Number: 4,482,044

[45] Date of Patent: Nov. 13, 1984

[54] APPARATUS FOR SEPARATING NESTED COILS

[75] Inventors: Howard E. Redman, Brewster; Roger O. Snowman, Weymouth, both of Mass.

[73] Assignee: Mathewson Corporation, Quincy, Mass.

[21] Appl. No.: 374,001

[22] Filed: May 3, 1982

[51] Int. Cl.³ .............................................. B65G 47/24
[52] U.S. Cl. ................................... 198/388; 198/394; 198/953
[58] Field of Search ............... 198/382, 383, 388, 394, 198/953, 762, 420, 570, 771; 193/44

[56] References Cited

U.S. PATENT DOCUMENTS

| 3,023,738 | 3/1962 | Burgess | 198/762 |
|---|---|---|---|
| 3,193,136 | 7/1965 | Stumpf et al. | 198/394 |
| 3,990,587 | 11/1976 | Redman | 198/394 |
| 4,063,642 | 12/1977 | Sticht et al. | 198/953 |
| 4,369,874 | 1/1983 | Kettner et al. | 198/953 |
| 4,396,108 | 8/1983 | Sticht | 198/953 |

Primary Examiner—Joseph E. Valenza
Attorney, Agent, or Firm—Robert T. Gammons

[57] ABSTRACT

Apparatus for partially or wholly separating individual coils from batches of interengaged coils comprising supporting structure for receiving the batches of coils standing upright, columnar springs supporting the structure, vibrators fastened to the supporting structure, and controls for controlling the amplitude and frequency of vibration of the vibrators.

5 Claims, 6 Drawing Figures

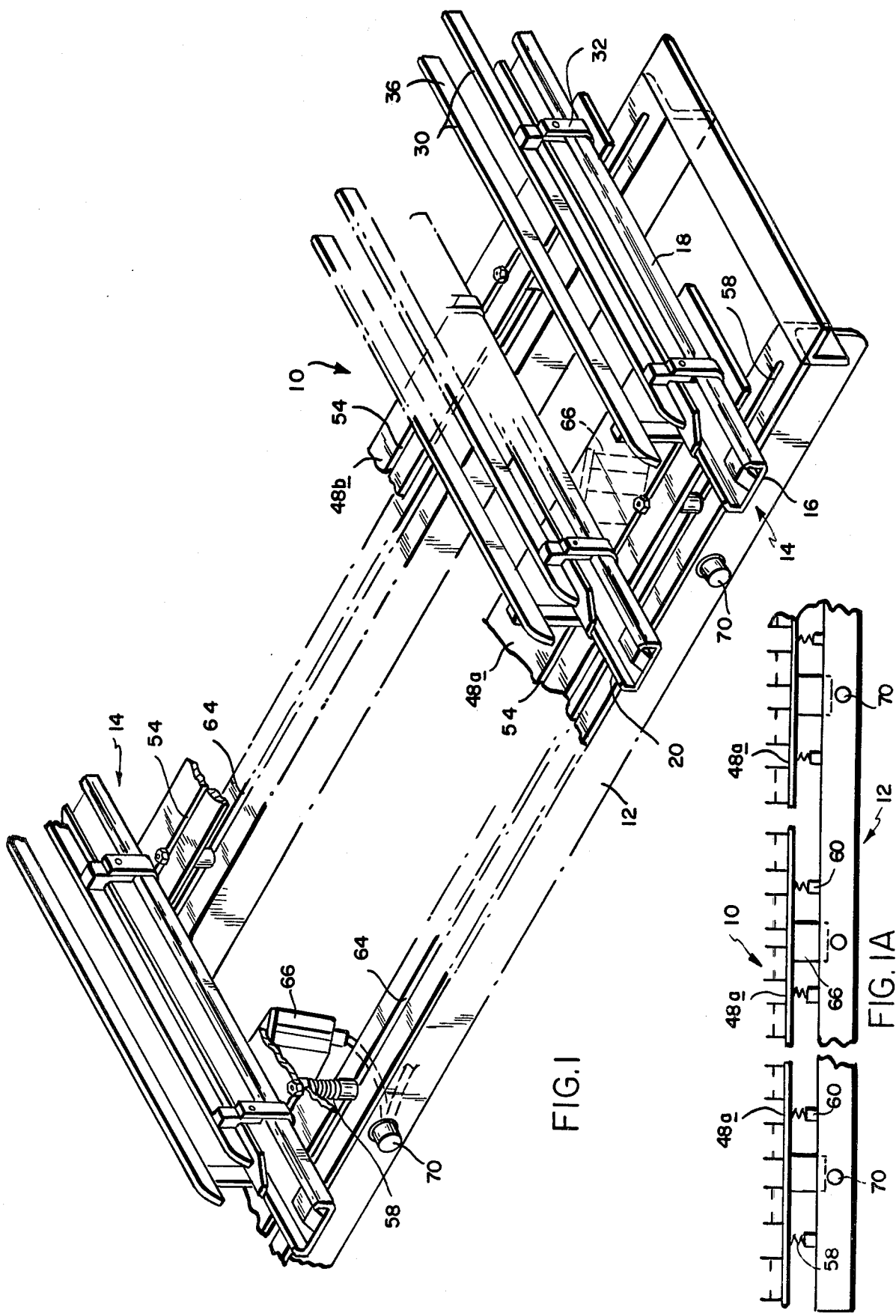

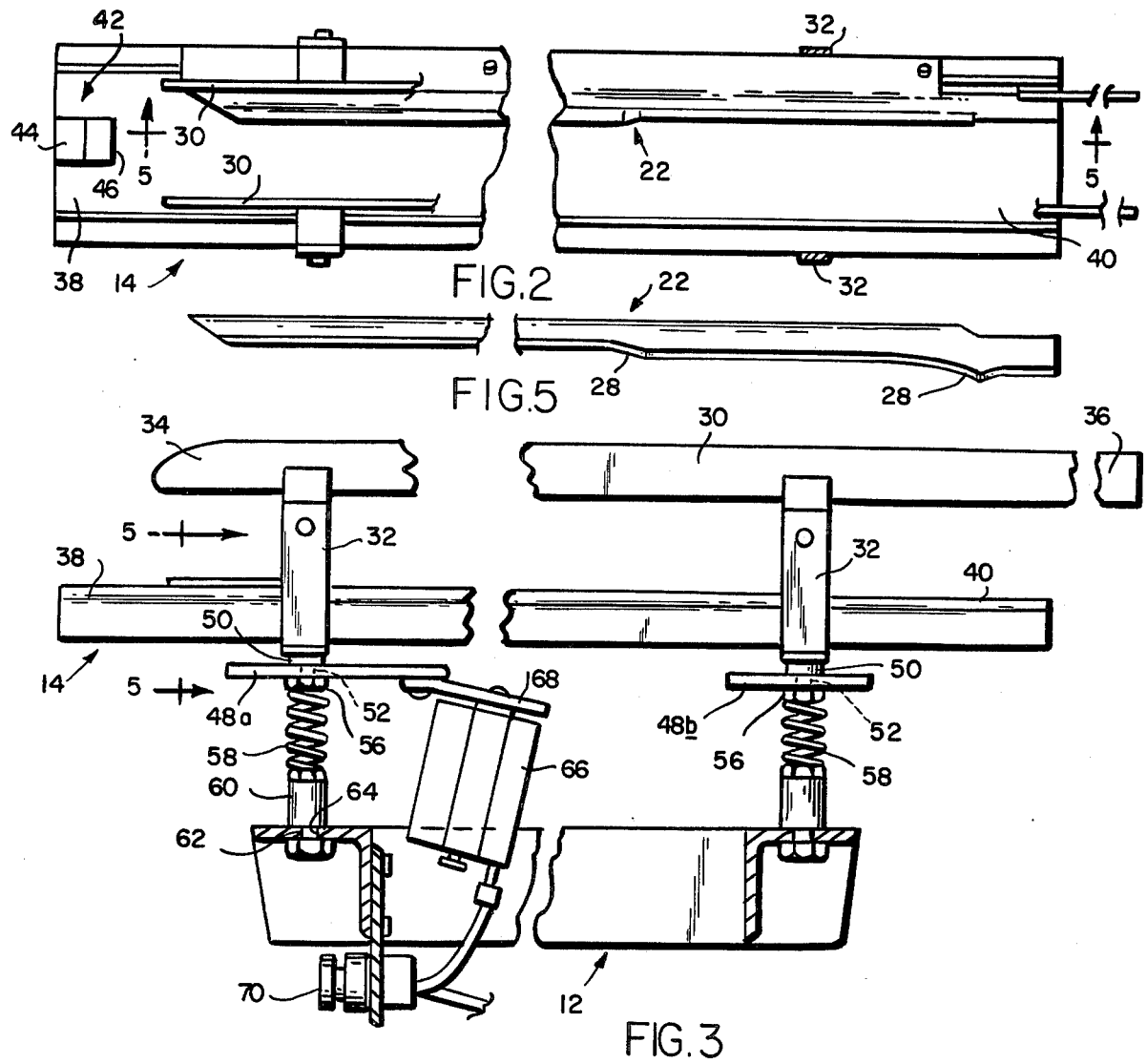
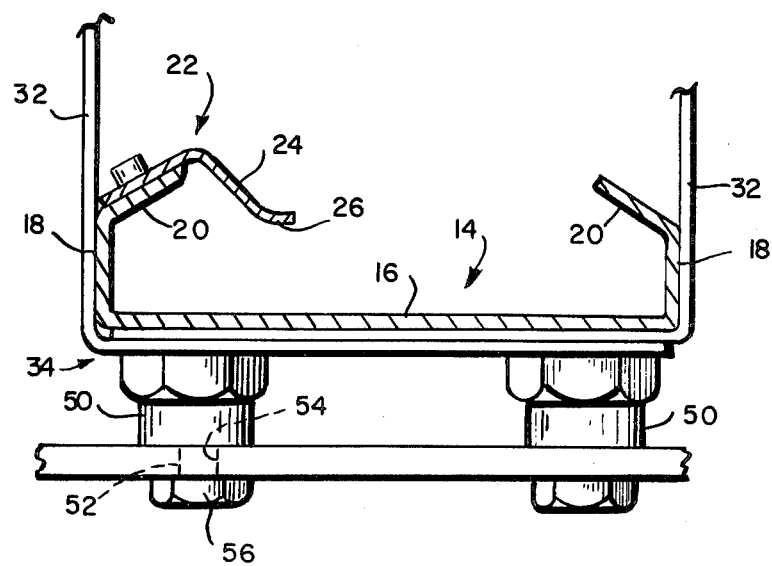

APPARATUS FOR SEPARATING NESTED COILS

BACKGROUND OF INVENTION

U.S. Pat. No. 3,990,587 discloses apparatus for transferring coils to a coil assembly machine. The aforesaid machine is designed to effect separation of individual coils from batches of interengaged coils and, for this purpose, is provided with transversely-spaced coil conveyors in the form of conveyor belts for moving batches of coils standing on end along a predetermined path toward the assembly machine, the conveyors being provided with longitudinally-spaced lugs for urging the coils forwardly. There are tracks along the opposite sides of the conveyor which, by frictional engagement with the coils as they are pulled forwardly by the conveyors, tend to disengage the coils from each other. It is the purpose of this invention to provide supplementing feeding apparatus for receiving batches of coils and automatically feeding them in partially or wholly separated condition to the conveyor belts of the aforesaid coil transfer apparatus.

SUMMARY OF THE INVENTION

The apparatus as herein illustrated is for effecting a partial or whole separation of coils from batches of interengaged coils and automatically presenting them to the conveyors of coil transfer apparatus such as disclosed in the U.S. Pat. No. 3,990,587 and comprises a plurality of coil supporting structures in the form of transversely-spaced, parallel trays constructed to receive batches of nested coils standing upright. The trays provide flat supporting surfaces inclined downwardly toward the conveyors of the coil transfer apparatus along which the coils are free to move when motivated and, in accordance with this invention, there is means for vibrating the trays to effect separation of the coils one from another while resting on the trays and movement along the trays in the direction of inclination, and means for controlling the frequency and amplitude of vibration. There are retaining means along the longitudinal sides of the tray spaced from the supporting surfaces for confining the lower ends of the coils and stabilizing means spaced upwardly therefrom for engagement with the helices of the coils between the upper and lower ends. There is also means along the longitudinal sides of the trays for turning disengaged coils about their vertical axes by intercepting the knots at the lower ends to a position such that the coils all face in the same direction. Preferably, the trays are yieldably mounted in groups on a subframe for adjustment of the adjacent groups relative to each other to change the spacing between groups and for adjustment of the trays relative to each other in each group. Specifically, the groups of trays are bolted to pairs of intermediate supports and the intermediate supports are, in turn, mounted by means of springs on the subframe.

The means for effecting vibration of the trays comprise vibrators fastened to the rear ones of the pair of intermediate supports. Desirably, the forward ones of the pairs of intermediate supports are shorter than the rear ones so that the trays slope downwardly in the direction of movement of the springs.

The invention will now be described in greater detail with reference to the accompanying drawings, wherein:

FIG. 1 is a perspective view of a plurality of coil receiving trays arranged in spaced, parallel relation in groups of two or more on intermediate supports which are, in turn, yieldably mounted on a subframe;

FIG. 1A diagrammatically illustrates a subframe, intermediate supports yieldably mounted thereon, and coil supporting trays mounted on the intermediate supports;

FIG. 2 is a plan view of a single coil receiving tray;

FIG. 3 is an elevation as seen from the right side of FIG. 1 broken away in part;

FIG. 4 is an enlarged transverse section taken on the line 4—4 of FIG. 3; and

FIG. 5 is an elevational view taken on the line 5—5 of FIG. 2 showing the knot turning means.

Referring to the drawings, FIG. 1, there are shown a plurality of spaced, parallel coil supporting structures 10 mounted on a rigid supporting frame 12. Each of the coil supporting structures 10 comprises an elongate shallow tray 14 having a bottom wall 16 and spaced, parallel, upstanding side walls 18—18, FIG. 4, the latter terminating at their upper ends in inwardly-inclined flanges 20—20. The width of the tray 14 is sufficient to receive the lower ends of the coils placed in the tray and the height of the side walls 18—18 and flanges 20—20 are such as to engage the helices of the coils above their lower ends to thus confine and guide the coils resting on the bottom of the tray as they are separated and moved along the tray.

A coil orienter 22 is secured to the flange 20 at the left side as seen in FIG. 4 throughout the length of the flange having an inwardly and downwardly-inclined part 24 and a horizontal part 26. The latter part 26 has longitudinally-depressed areas 28—28 which, by intercepting the knots at the lower ends of the coils, cause the coils to be turned about their vertical axes so that all the coils face in the same direction. There are, in addition to the side walls 18—18, side rails 30—30 mounted above the upper edges of the side walls 18—18. The side rails are supported by transversely-spaced arms 32—32 of U-shaped brackets 34—34 fastened to the underside of the tray with the arms 32—32 projecting upwardly therefrom. As shown in FIG. 3, the rails 30—30 are tapered at one end 34 and blunt at the opposite ends 36. The tapered ends 34 are set inwardly from the receiving end 38 of the tray and the blunt ends 36 project beyond the discharge end 40 of the tray.

The tray 10 is inclined at a very slight angle (2½° to 5°) downwardly from the receiving end 38 to the discharge end 40 and at the receiving end there is a block 42 provided with a ramp 44 at one end to permit the coils to be pushed into the trays and an abutment 46 at the other side to prevent the coils from spilling off the receiving end after they have been placed in the tray.

In accordance with the invention, batches of interengaged coils are placed on the trays at their receiving ends with their lower ends engaged below the flanges 20—20 and their upper portions engaged between the rails 30—30, whereupon the trays are vibrated at a sufficient amplitude and frequency to cause the individual coils to become separated from each other and to move along the trays toward the discharge ends which deliver the coils to the conveyor belts of the coil transfer apparatus disclosed in the aforementioned U.S. Pat. No. 3,990,587. To provide for such vibration, the trays are mounted in groups of two or more trays on pairs of intermediate supports 48a, 48b which are, in turn, yieldably mounted on the supporting frame 12. As shown, each pair of intermediate supports comprises a rear plate 48a and a front plate 48b. The trays 10 are mounted on the plates 48a,48b by means of studs 50 which extend from their undersides provided with threaded extensions 52 which extend through slots 54 in the plates. At the lower ends of the threaded extensions, there are retaining nuts 56. The trays 10 are thus adjustable relative to each other to change their spacing. The plates 48a,48b, in turn, are yieldably supported by coil springs 58, the upper ends of which are secured to the undersides of the plates and the lower ends of which are seated in studs 60 provided with extensions 62 secured to slots 64 in the supporting frame 12 which thus provides for adjusting the spacing between groups of trays. The downward inclination of the trays is obtained by making the studs 60 at the lower end of the spring 58 supporting the front plates 48b shorter than those supporting the rear plates 48a. As thus supported, the pairs of intermediate supports 48a,48b and groups of trays 10 mounted therein are free to move a limited amount. Vibration is effected by means of vibrators 66 fastened by means of bracket arms 68 to the rear plates 48a. The springs 58 are yieldable in compression and longitudinally flexible.

The vibrators 66 are controllable in conventional fashion both as to amplitude and frequency. The vibrators used herein are piston vibrators FP-25-N available through Vibratechniques Corporation. Other vibrators, however, may be substituted therefor.

Each vibrator 66 is provided with a control 70. These knobs are mounted in supporting frame 12 of the machine which, by controlling the pressure, control the frequency of the vibration. Screws, not shown, at the base of each vibrator control the amplitude.

The supporting frame 12 on which are mounted the coil receiving structures 10 is supported at the receiving ends of the coil transfer apparatus of the aforesaid patent with the discharge ends 38 of the trays close enough to the receiving ends of the conveyors so that, as the coils are pushed beyond the discharge end of the trays, they become caught on the lugs on the conveyor belts and are moved forwardly by the conveyor belts of the coil transfer apparatus. The inclination of the trays is sufficient so that when the coils become partially or totally separated by the vibration, they will gravitate toward the discharge ends of the trays.

By mounting the trays in groups for movement relative to each other within the groups and mounting the groups for movement relative to each other as diagrammatically shown in FIG. 1A, it is possible to obtain spring distribution for single, double, queen size and king size spring assemblies.

It should be understood that the present disclosure is for the purpose of illustration only and includes all modification or improvement which fall within the scope of the appended claims.

What is claimed is:

1. Apparatus for supplying coils to a plurality of spaced, parallel coil feeding means wherein the feeding means are transversely-adjustable relative to each other to change the spacing between the feeding means comprising a rigid, substantially rectangular frame disposed with its long axis transversely of the feeding means defining transversely-extending fore and aft planar supporting surfaces, said planar surfaces containing transversely-disposed longitudinal slots, a plurality of trays mounted to the support surfaces in transversely-spaced, parallel relation, means fixed to the trays and slidably interengaged with the slots permitting movement of the trays relative to each other to align them with the spacing of the feeding means, said means comprising coil springs fixed at their upper ends to the undersides of the trays and at their lower ends adjustable along said slots, said springs at the delivery end of the trays being shorter than those at the receiving ends of the trays such that the trays slope downwardly from the receiving ends toward the delivery ends, means for vibrating the trays said trays each comprising an elongate channel member of generally rectangular cross section having a planar bottom surface, spaced, parallel, upstanding sides and inwardly and upwardly-inclined flanges and each tray having at its receiving end an abutment rising from its planar bottom surface, wherein one of said flanges embodies coil turning means which, by intercepting the knots at the lower ends of the coils, turns the coils about their vertical axes so that the attitude of all of the coils is the same.

2. Apparatus according to claim 1 wherein one of said flange comprises an elongate part positioned at one side of the tray and parallel to both the side and bottom thereof embodying at least one depressed area which, by intercepting the knots at the lower ends of the coils, turns the coils about their vertical axes so that they are all facing the same direction.

3. Apparatus according to claim 1 wherein one of said flange comprises an elongate part positioned at one side of the tray and parallel to both the side and bottom thereof embodying two longitudinally-spaced, depressed areas which, by successively intercepting the knots at the lower ends of the coils, turn the coils about their vertical axes so that they all face in the same direction.

4. Apparatus according to claim 1 wherein there is means for controlling the amplitude of the vibrators and the frequency of vibration of the vibrators.

5. Apparatus according to claim 1 wherein the tray is pitched toward the one end $2\frac{1}{2}°$ to $5°$.

* * * * *